United States Patent
Cao et al.

(10) Patent No.: US 11,918,015 B2
(45) Date of Patent: Mar. 5, 2024

(54) SAUSAGE ADDITIVE COMPRISING CELLULOSE ETHER AND NATURAL GUMS

(71) Applicant: Dow Global Technologies LLC, Midland, MI (US)

(72) Inventors: Kai Cao, Shanghai (CN); Zheng Yong Yan, Shanghai (CN); Dong Yun, Shanghai (CN); Xiuqin Shi, Shanghai (CN); Xiaoyi Pang, Shanghai (CN)

(73) Assignee: Nutrition & Biosciences USA 1, LLC, Rochester, NY (US)

( * ) Notice: Subject to any disclaimer, the term of this patent is extended or adjusted under 35 U.S.C. 154(b) by 962 days.

(21) Appl. No.: 14/758,814

(22) PCT Filed: Jan. 30, 2013

(86) PCT No.: PCT/CN2013/071163
§ 371 (c)(1),
(2) Date: Jul. 1, 2015

(87) PCT Pub. No.: WO2014/117349
PCT Pub. Date: Aug. 7, 2014

(65) Prior Publication Data
US 2015/0351440 A1    Dec. 10, 2015

(51) Int. Cl.
*A23L 29/238* (2016.01)
*A23L 13/40* (2023.01)
*A23L 13/60* (2016.01)
*A23L 29/244* (2016.01)
*A23L 29/256* (2016.01)
*A23L 29/262* (2016.01)

(52) U.S. Cl.
CPC .......... *A23L 29/238* (2016.08); *A23L 13/422* (2016.08); *A23L 13/65* (2016.08); *A23L 29/244* (2016.08); *A23L 29/256* (2016.08); *A23L 29/262* (2016.08); *A23V 2002/00* (2013.01)

(58) Field of Classification Search
CPC .................................................. A23L 13/65
USPC ........................................................ 426/574
See application file for complete search history.

(56) References Cited

U.S. PATENT DOCUMENTS

| | | | |
|---|---|---|---|
| 4,348,420 A | 9/1982 | Lynch et al. | |
| 4,427,704 A | 1/1984 | Cheney et al. | |
| 4,851,394 A * | 7/1989 | Kubodera | A22C 13/0013 106/217.7 |
| 5,049,401 A * | 9/1991 | Harada | C08B 37/009 426/573 |
| 5,213,834 A | 5/1993 | Ikeda et al. | |
| 5,270,071 A | 12/1993 | Sharp et al. | |
| 8,003,152 B1 * | 8/2011 | Xiong | A23G 9/34 426/573 |
| 2008/0260908 A1 | 10/2008 | Mutilangi et al. | |
| 2011/0076364 A1 | 3/2011 | Auf der Heide et al. | |

FOREIGN PATENT DOCUMENTS

| | | |
|---|---|---|
| CN | 1126561 | 7/1996 |
| CN | 1371630 A | 10/2002 |
| EP | 2515678 | 8/2013 |
| JP | 2009028003 A | 2/2009 |
| WO | 2008131061 A1 | 10/2008 |
| WO | 2012173838 A1 | 12/2012 |

OTHER PUBLICATIONS

Google Translation of JP2009028003; 2009, JP, Sugise; accessed on Aug. 30, 2020.*
Sarkar, Thermal Gelation Properties of Methyl and Hydroxypropyl Methylcellulose, Journal of Applied Polymer Science, vol. 24,1073-1087 (1979).*
Methocel MX, Food Navigator, 2010, accessed at https://www.foodnavigator.com/Product-innovations/Methocel-MX-delivers-innovation-in-meat-products.*
Hsu et al., Interactions of konjac, agar, curdlan gum,—carrageenan and reheating treatment in emulsified meatballs, J. of Food Engineering, vol. 44, No. 4, 2000, pp. 199-204.
Foegeding et al., Effect of Gums on Low-Fat Meat Batters, J. of Food Science, vol. 51, No. 1, 1986, pp. 33-46.
Anonymous: Bulletin, AVC591-SPEC-03/09.RS, 2009, retrieved from Internet: URL:http://www.signetchem.com/downloads/datasheets/Fmc-biopolymer/avicel-Rc-591-Specifications.pdf.

* cited by examiner

*Primary Examiner* — Amber R Orlando
*Assistant Examiner* — Philip A Dubois

(57) ABSTRACT

An edible composition consisting of (a) natural gum comprising a polysaccharide hydrocolloid (a1) containing mannose repeating units; (b) carrageenan; (c) cellulose ether, and optionally (d) water, wherein the weight ratio of carrageenan (b) to polysaccharide hydrocolloid (a1) ranges from 0.4:1 to 1.4:1 and the weight ratio of cellulose ether (c) to polysaccharide hydrocolloid (a1) is at least 0.02:1; its use in an edible product; and the edible product, typically sausage, comprising the edible composition.

18 Claims, No Drawings

SAUSAGE ADDITIVE COMPRISING CELLULOSE ETHER AND NATURAL GUMS

BACKGROUND OF THE INVENTION

The present invention relates to a combination of cellulose ether and natural gums useful as sausage additive, more specifically as a binder for sausage-type meat products.

Sausage is a main processed product of the meat industry and its production dates back centuries. Nowadays, more and more sausage manufactures pursue improved sausage textural quality such as smooth surface and section, high oil and water retention, no cracking during cooking, and organoleptic quality, such as high chewiness and hardness, high springiness, high cohesiveness and low adhesiveness. Their other concern is the control of manufacturing costs without reducing quality.

U.S. Pat. No. 4,348,420 relates to a process for binding comminuted meat in the presence of a water soluble dairy protein, such as alkali metal caseinates, and a hydrocolloid. The hydrocolloid is selected from the group consisting of algin, carrageenan, guar, acacia, locust bean gum, carboxymethyl cellulose and carboxymethyl starch. A combination of a cellulose ether with one or more natural gums is not taught. The problem underlying U.S. Pat. No. 4,348,420 was to avoid fall-off in yield after extensive chopping in dairy-protein containing comminuted meat.

U.S. Pat. No. 5,213,834 concerns a low-calorie food comprising chopped gel particles of a neutral, complete coagulum of glucomannan. A natural gum (including amongst others carrageenan) as a binder and/or an edible emulsifier including for example fatty acid esters, soybean phospholipid, egg yolk, milk casein and natural polymer derivatives such as carboxymethyl cellulose and methylcellulose may be added together with the gel particles. U.S. Pat. No. 5,213,834 does not describe the specific combination of a cellulose ether with carrageenan.

An article in "MEAT REASEARCH" (2008. 10. pages 28-30) by Fu Qiangquan et al. a blend of carrageenan and konjac gum is used as a sausage additive to improve its texture. However, the hardness of the sausage is insufficient.

The problem underlying the present invention is to provide an additive which improves the quality of sausage in terms of texture and organoleptic properties, preferably without increasing the manufacturing cost.

SUMMARY OF THE INVENTION

The problem is solved by an edible composition consisting of
(a) natural gum comprising a polysaccharide hydrocolloid (a1) containing mannose repeating units;
(b) carrageenan;
(c) cellulose ether, and optionally
(d) water,
wherein the weight ratio of carrageenan (b) to polysaccharide hydrocolloid (a1) ranges from 0.4:1 to 1.4:1 and the weight ratio of cellulose ether (c) to polysaccharide hydrocolloid (a1) is at least 0.02:1.

The present invention is also directed to a binder blend comprising 1 to 99% by weight of the above edible composition and 1 to 99% by weight of protein.

Further, the present invention relates to an edible product comprising 0.05 to less than 100% by weight of the above edible composition, wherein the weight ratio of carrageenan (b) to polysaccharide hydrocolloid (a1) in the edible product ranges from 0.4:1 to 1.4:1 and the weight ratio of cellulose ether (c) to polysaccharide hydrocolloid (a1) in the edible product is at least 0.02:1.

Moreover, the present invention concerns the use the edible composition, typically as a binder, in an edible product, preferably an edible product comprising comminuted meat such as sausage.

It is surprising that the addition of a combination of the above natural gum (a), carrageenan (b), and cellulose ether (c) in the prescribed ratios to a sausage-type product considerably improves its quality.

DETAILED DESCRIPTION

Component (a) of the edible composition according to the present invention is a natural gum comprising a polysaccharide hydrocolloid (a1) containing mannose repeating units. The term "natural gum" as used herein includes one type of natural gum as well a mixtures of various types of natural gums. The term "polysaccharide hydrocolloid" as used in the present application includes one type of polysaccharide hydrocolloid as well as mixtures of different types of polysaccharide hydrocolloids. Hydrocolloids are well known to the person skilled in the art and polysaccharide hydrocolloids are polysaccharide-based compositions that form colloidal dispersions (also referred to as "colloidal solutions") in water. Typically, they are also able to form gels.

In preferred embodiments the polysaccharide hydrocolloid (a1) is selected from glucomannan, galactomannan, and mixtures thereof. Typically, the natural gum (a) for use in the present invention is a vegetable gum such as konjac gum, fenugreek gum, guar gum, tara gum, locust bean gum (carob gum), or a mixture of at least two of them. In addition to the polysaccharide hydrocolloids (a1) the natural gums (a) may contain water in varying amounts depending on the method of refining.

For the ease of understanding and to conform to usual practice in the art the polysaccharides within this application are referred to by the names of their open chain forms (e.g. glucose) irrespective of their actual conformation which is in the polysaccharide molecule, of course, always the ring form. The 6-membered rings are known as pyranoses. For example, in the case of glucose units within a polysaccharide their correct designation would be glucopyranose unit which term is less common to describe the composition of a polysaccharide.

Glucomannan is a polysaccharide that consists of D-glucose (G-unit) and D-mannose (M-unit) in a proportion of 5:8 joined by 1β→4 linkages. The basic polymeric repeating unit has the pattern: GGMMGMMMMMGGM. Short side chains of 11-16 monosaccharides occur at intervals of 50-60 units of the main chain attached by 1β→3 linkages. Also, acetate groups on carbon 6 occur at every 9-19 units of the main chain. Preferably, the glucomannan for use in the present invention is non-coagulated, i.e. it is preferably not alkali-treated. Glucomannan is the main ingredient of konjac gum obtained from tubers of Amorphophallus konjac. After refining, the konjac gum as commercially available may still contain water and other ingredients. Typically, the konjac gum for use in the present invention comprises at least 40% by weight or at least 50% by weight or at least 60% by weight or at least 70% by weight or at least 80% by weight or at least 90% by weight or at least 92% by weight of glucomannan, each based on the weight of the konjac gum.

Galactomannans are polysaccharides consisting of a D-mannose backbone with D-galactose side groups. The mannose units are linked with 1β→4 linkages to which galactose units are attached with 1α→6 linkages. Galactomannans are present in several vegetable gums and the approximate ratios of mannose to galactose for the following gums are: fenugreek gum: mannose:galactose=1:1; guar gum: mannose:galactose=2:1; tara gum: mannose:galactose=3:1; and locust bean gum (carob gum): mannose:galactose=4:1 After refining, the locust bean gum as commercially available may still contain water and other ingredients. Typically, the locust bean gum for use in the present invention comprises at least 40% by weight or at least 50% by weight or at least 60% by weight or at least 70% by weight or at least 80% by weight or at least 90% by weight or at least 92% by weight of galactomannan, each based on the weight of the locust bean gum.

Preferably, the natural gum (a) is konjac gum, locust bean gum or a mixture thereof. Konjac gum is most preferred for component (a) of the present edible composition.

Component (b) of the edible composition according to the present invention is carrageenan. Carrageenan (b) is a generic term for a family of linear sulfated polysaccharides that are extracted from seaweeds such as for example *Gigartina* and *Chondrus crispus* (Irish Moss). All carrageenans are polysaccharides made of repeating units of galactose and 3,6-anhydrogalactose (3,6-AG), both sulfated and non-sulfated. The units are joined by alternating 1α→3 and 1β→4 glycosidic linkages. The three main commercial classes of carrageenan are κ-carrageenan, ι-carrageenan, and λ-carrageenan; however additional types of carrageenan exist. In the present edible composition any type of carrageenan may be used, either alone or in admixtures with at least one other type. In preferred embodiments component (b) comprises κ-carrageenan.

Component (c) of the edible composition according to the present invention is cellulose ether. Examples of useful cellulose ethers include $C_1$-$C_3$-alkyl celluloses such as methyl cellulose, $C_1$-$C_3$-alkyl hydroxy-$C_1$-$C_3$-alkyl celluloses such as hydroxypropyl methylcellulose, hydroxyethyl methylcellulose, and ethyl hydroxyethyl cellulose; hydroxy-$C_1$-$C_3$-alkyl celluloses such as hydroxyethyl cellulose and hydroxypropyl cellulose; and mixed hydroxy-$C_1$-$C_3$-alkyl celluloses such as hydroxyethyl hydroxypropyl cellulose. In preferred embodiments the cellulose ether (c) is hydroxypropyl methylcellulose (HPMC) (c1), methylcellulose (MC) (c2) or a mixture of both. HPMC (c1) is most preferred.

A preferred HPMC (c1) for use in the present invention has an average degree of substitution $DS_{methyl}$ of from 1.4 to 2.5, preferably of from 1.6 to 2.0, and more preferably from 1.7 to 1.9 and a molar degree of substitution $MS_{hydroxypropyl}$ of from 0.1 to 0.4, preferably of from 0.1 to 0.3 and more preferably of from 0.1 to 0.2. Typically, viscosities of 2% by weight aqueous solutions of HPMC (c1) at 25° C., determined with a Brookfield LVT viscometer (3# spindle, testing speed 50 rpm), range from 20 to 100 mPa·s, preferably from 40 to 70 mPa·s, more preferably from 48 to 60 mPa·s, and most preferably the 2% by weight viscosity is about 50 mPa·s. An illustrative example of commercially available HPMC (c1) that is useful in the present invention is Methocel™ F50 ($DS_{methyl}$=1.7-1.9; $MS_{hydroxypropyl}$=0.1-0.2; 2% by weight viscosity=50 mPa·s), available from The Dow Chemical Company, Midland, U.S.A.

A preferred MC (c2) for use in the present invention has an average degree of substitution $DS_{methyl}$ of from 1.4 to 2.2, more preferably from 1.5 to 2.1 and most preferably from 1.6 to 1.9. Typically, viscosities of 2% by weight aqueous solutions of MC (c2) at 25° C., determined with a Brookfield LVT viscometer (3# spindle, testing speed 50 rpm) range from 13,000 to 70,000 mP·s, preferably from 14,000 to 60,000 mP·s, and more preferably from 16,000 to 50,000 mP·s. Examples of commercially available MCs that are useful in the present invention include METHOCEL™ MX ($DS_{methyl}$=1.8, 2% by weight viscosity=50,000 mPa·s) and METHOCEL™ SG A7C ($DS_{methyl}$=1.9, 2% by weight viscosity=700 mPa·s), both grades being available from The Dow Chemical Company, Midland, U.S.A. or Dow Wolff Cellulosics, Walsrode, Germany.

$DS_{methyl}$ designates the average number of hydroxyl groups substituted by methoxy groups per anhydroglucose unit. $MS_{hydroxypropyl}$ is the average number of hydroxypropyl groups which are bound by an ether bond per mole of anhydroglucose unit. During the hydroxypropoxylation multiple substitutions can result in side chains.

The $DS_{methyl}$ and $MS_{hydroxypropyl}$ can be determined by Zeisel cleavage of the HPMC with hydrogen iodide and subsequent quantitative gas chromatographic analysis (G. Bartelmus and R. Ketterer, 1 Anal. Chem., 286 (1977) 161-190).

In addition to the amount of water that may be contained in the natural gum (a) the edible composition of the present invention optionally comprises further water (d) which may be contained in the carrageenan (b) and/or cellulose ether (c) as obtained as commercial products. Typically, the amount of water introduced by the carrageenan (b) is no more than 20% by weight, such as from 0 to 20% by weight or from 1 to 19% by weight or from 5 to 18% by weight or from 10 to 16% by weight or from 12 to 15% by weight, each based on the total weight of carrageenan (b) and water. Typically, the amount of water introduced by the cellulose ether (c) is less than 5% by weight, based on the total weight of cellulose ether (c) and water.

The term "consisting of" as used herein with respect to the edible composition is meant in the sense of "consisting essentially of", i.e. it does not exclude the presence of impurities introduced by components (a), (b) and/or (c). All components (a), (b), and (c) are natural or modified natural products, respectively, and the presence of impurities originating from the raw materials and/or introduced during refining, production and/or processing cannot be avoided completely. Accordingly, the edible composition of the present invention may contain minor amounts of impurities. It is difficult to determine the exact amount of impurities and their presence does not detract from the present invention.

Within the present edible composition consisting of components (a), (b) and (c) and optionally (d) the following weight ratios are to be observed. The weight ratio of carrageenan (b) to polysaccharide hydrocolloid (a1) ranges from 0.4:1 to 1.4:1, preferably from 0.6:1 to 1.2:1, more preferably from 0.7:1 to 1.1:1, and most preferably from 0.8:1 to 1.0:1. The weight ratio of cellulose ether (c) to polysaccharide hydrocolloid (a1) is at least 0.02:1. Typically it ranges from 0.02:1 to 18:1, especially typically from 0.1:1 to 15:1, preferably from 0.2:1 to 5:1, especially preferably from 0.25:1 to 3:1, more preferably from 0.3:1 to 2:1, even more preferably from 0.4:1 to 1.8:1 or from 0.4:1 to 1.6:1, still more preferably from 0.5:1 to 1.3:1, and most preferably from 0.6:1 to 1.1:1.

The edible composition of the present invention can be used as an additive in an edible product, typically an edible product comprising comminuted meat such as sausage, preferably cooked sausage.

The term "cooked sausage" is directed to an edible product (food product) which requires processing into an emulsion, followed by shaping and heating to solidify the product to a stable physical form. In this emulsion system the continuous phase (matrix) is mainly composed of water and protein (primarily myosin coming from the meat), and further additives including those of the present invention and starch, if present, and the dispersed phase is fat or oil which is embedded in the matrix and stabilized by protein or other materials with surface activity. The matrix ties the fat and water tightly into the whole system. As a result, the sausage performance is mainly determined by the matrix (continuous phase). Although the term "sausage" generally relates to a food product having an approximately cylindrical shape, similar products having the shape of a non-specific loaf are also encompassed herein by the term "sausage".

Typically, the present edible composition acts as a binder in an edible product comprising meat such as sausage, preferably cooked sausage. It enhances the matrix by reinforcing the interaction between the proteins and the polysaccharides such as carrageenan, cellulose ether and starch, etc.

In addition to myosin coming from the meat further proteins may be added to the matrix of a sausage, preferably cooked sausage, to enhance binding. Accordingly, the present invention is also directed to an edible binder blend comprising 1 to 99% by weight, preferably 10 to 90% by weight, and more preferably 20 to 85% by weight of the above edible composition consisting of components (a), (b), (c) and optionally (d), and 1 to 99% by weight, preferably 10 to 90% by weight, and more preferably 15 to 80% by weight of a protein. The protein may be derived from vegetable and animal sources such as dairy sources. The term "protein" as used in the present application includes one type of protein as well as mixtures of different types of protein. Exemplary proteins include soy protein, soy protein isolate, wheat protein, whey protein, sodium caseinate, and mixtures thereof.

More generally, the present invention concerns an edible product, typically a food product, that comprises 0.05 to less than 100% by weight of the above edible composition consisting of components (a), (b), (c), and optionally (d). In some embodiments the edible product comprises comminuted or ground meat. It is preferred that the edible product comprises 0.1 to 4% by weight of the above edible composition and 8 to 70% by weight of comminuted meat. In some embodiments the edible product comprises 0.1 to 1.5% by weight, preferably 0.2 to 1% by weight of the above edible composition, and 8 to 15% by weight or 10 to 14% by weight of comminuted meat. In other embodiments the edible product comprises 0.8 to 4% by weight, preferably 1 to 3% by weight, and more preferably 1.1 to 2% by weight of the above edible composition, and more than 15 to 70% by weight or 20 to 30 or 20 to 40 or 20 to 50 or 20 to 60% by weight of comminuted meat. Typically, the meat-containing edible product is sausage, preferably cooked sausage. Sausage having a relatively lower amount of meat (no more than 15% by weight) is designated "low end sausage" whereas sausage having a higher amount of meat (more than 15% by weight) is designated "mid-high end sausage".

Besides meat and water, fat is an essential ingredient of sausage. Exemplary fat components include leaf fat, duck skin, and chicken fat. Typically, the amount of fat within sausage ranges from 5 to 50% by weight, such as from 7 to 20% by weight or from 10 to 30% by weight.

Depending on the traditions and legal provisions of the respective countries sausage may contain a variety of further ingredients. Examples include fillers such as starch; sugar and sweeteners; additional polysaccharide hydrocolloids different from components (a), (b) and (c) such as xanthan gum; spices; flavoring agents; flavor enhancers; emulsifiers; and preservatives. In some embodiments the edible product does not contain any further organic emulsifier different from cellulose ether (c).

Additional amounts of components (a), (b) and/or (c) may also be added to the edible product. However, the total amounts of each of components (a1), (b) and (c) must always fulfill the weight ratio requirements as described above for the edible composition, including preferred ranges, in order to get the benefits of the present invention.

The sausage that is produced by adding the edible composition according to the present invention exhibits improved sausage textural quality such as smooth surface and section, high emulsion stability, no cracking during cooking, and improved organoleptic (sensory) quality, such as high chewiness and hardness, high springiness, high cohesiveness. In preferred embodiments the sausage also exhibits low adhesiveness. This remarkable improvement in sausage quality is not concomitant of an increase in production cost. The enhancement in texture is due to the unique combination of polysaccharide hydrocolloid (a1), carrageenan (b) and cellulose ether (c). Carrageenan (b) can strongly lock water through hydrogen bonding and it can also react with myosin under complexation to produce a strong gel. It has been found that the presence of polysaccharide hydrocolloid (a1) leads to a synergism and the gel is further enhanced. The cellulose ether (c) which has surface activity is believed to act as an emulsifier, thus promoting the stabilizing effect of the myosin and further proteins, if present.

Some embodiments of the invention will now be described in detail in the following examples.

EXAMPLES

All percentages are given by weight unless otherwise indicated.

Raw Materials

| Ingredient | Supplier |
|---|---|
| Pork lean | Aisen Co., China |
| Leaf fat | Aisen Co., China |
| Chicken breast | Carrefour Supermarket, China |
| Duck skin | Carrefour Supermarket, China |
| Soy protein isolate | Chinese subsidiary of DuPont, |
| Methocel ™ F50 (HPMC with $DS_{methyl}$ = 1.7-1.9; $MS_{hydroxypropyl}$ = 0.1-0.2; 2% by weight viscosity = 50 mPa · s) | Chinese subsidiary of The Dow Chemical Company |
| Methocel ™ MX (supergelling MC with a $DS_{methyl}$ = about 1.8; 2% by weight viscosity = 50,000 mPa · s) | Chinese subsidiary of The Dow Chemical Company |

| Ingredient | Supplier |
| --- | --- |
| Konjac (including ≤8% by weight of water) | Runchuang Co., China |
| Locust bean gum (including ≤8% by weight of water) | Heibei BaiWei Bioengineering Co., LTD, China |
| κ-Carrageenan (including 12 to 15% by weight of water) | Beilian Co., China |
| Guar gum (including ≤12% by weight of water) | Junkai Co., China |
| Fenugreek gum (including ≤10% by weight of water) | Mingrui Co., China |
| Tara gum (including ≤10% by weight of water) | Shanghai Tuochen Co., China |
| KCl | Jiangsu Kolod Food Ingredients Co., China |
| NaCl | China National Salt Industry Corporation, China |
| Sodium tripolyphosphate | Shenzhen BrightChina Industrial Co., China |
| Sodium pyrophosphate | Shenzhen BrightChina Industrial Co., China |
| Sodium hexametaphosphate | Shenzhen BrightChina Industrial Co., China |
| Monosodium glutamate | Taitai le Co., China |
| Wheat starch | Shandong Jincheng Co., China |
| Patato starch | Shandong Jincheng Co., China |
| Corn Starch | Shandong Jincheng Co., China |
| Acetylated distarch phosphate | Jilin Zhenghao Modified Starch & Technology Development Co., LTD, China |
| Transglutaminase enzyme (TG) | Taixing Dongsheng Food Science & Technology Co., China |
| Sodium caseinate | Junlong Co., China |
| Granulated sugar (sucrose) | Shanghai Heyu Co., China |
| The five-spice powder | Sichuan Youjia Co., China |

Mid-High End Sausage

Table 1 shows inventive formulations of mid-high end sausage and Table 2 shows comparative formulations of mid-high end sausage.

IE M1 uses the present inventive edible blend comprising konjac, carrageenan and Methocel™ F50 in a weight ratio of 5:5:3. IE M2 replaces 5% pork lean with 5% soy protein isolate. IE M3 replaces pork lean and leaf fat by chicken breast and duck skin, respectively. IE M4 replaces Methocel™ F50 with Methocel™ MX, compared to IE M3. The weight ratio of konjac:carrageenan:cellulose ether is equal to 5:5:5 in IE M5, equal to 5:5:7 in IE M6 and equal to 5:5:60 in IE M7. CE M8 excludes the Methocel™ F50. CE M9 excludes any hydrocolloid, but contains more pork lean in order to maintain the same cost as the other examples. CE M10 uses one kind of commercial sausage gum as benchmark. CE M11 is similar to CE M9 but replaces pork lean and leaf fat with chicken breast and duck skin, respectively, and further uses soy protein isolate. CE M11 to M13 all utilize transglutaminase (TG) enzyme which can form an extensively cross-linked protein network. While CE M11 is void of any polysaccharide hydrocolloid CE M12 uses Methocel™ F50 in combination with konjac but lacks carrageenan and CE M13 uses Methocel™ F50 in combination with carrageenan but lacks konjac.

TABLE 1

Inventive Formulations of Mid-High End Sausage

|  | Inventive Ex. M1 (IE M1) | Inventive Ex. M2 (IE M2) | Inventive Ex. M3 (IE M3) | Inventive Ex. M4 (IE M4) | Inventive Ex. M5 (IE M5) | Inventive Ex. M6 (IE M6) | Inventive Ex. M7 (IE M7) |
| --- | --- | --- | --- | --- | --- | --- | --- |
| Pork lean | 30.00% | 25.00% | — | — | — | — | — |
| Leaf fat | 10.00% | 10.00% | — | — | — | — | — |
| Chicken breast | — | — | 30.00% | 30.00% | 30.00% | 30.00% | 30.00% |
| Duck skin | — | — | 10.00% | 10.00% | 10.00% | 10.00% | 10.00% |
| NaCl | 2.00% | 2.00% | 2.00% | 2.00% | 2.00% | 2.00% | 2.00% |
| Sodium tripolyphosphate | 0.15% | 0.15% | 0.15% | 0.15% | 0.15% | 0.15% | 0.15% |
| Sodium pyrophosphate | 0.20% | 0.20% | 0.20% | 0.20% | 0.20% | 0.20% | 0.20% |
| Sodium hexametaphosphate | 0.15% | 0.15% | 0.15% | 0.15% | 0.15% | 0.15% | 0.15% |
| Monosodium glutamate | 0.50% | 0.50% | 0.50% | 0.50% | 0.50% | 0.50% | 0.50% |
| KCl | 0.07% | 0.07% | 0.07% | 0.07% | 0.07% | 0.07% | 0.07% |
| Konjac | 0.50% | 0.50% | 0.50% | 0.50% | 0.433% | 0.382% | 0.09% |
| Carrageenan | 0.50% | 0.50% | 0.50% | 0.50% | 0.433% | 0.382% | 0.09% |
| Methocel ™ F50 | 0.30% | 0.30% | 0.30% | — | 0.433% | 0.535% | 1.12% |
| Methocel ™ MX | — | — | — | 0.30% | — | — | — |
| Soy protein isolate | — | 5.00% | — | — | — | — | 1.30% |
| TG | — | — | 0.20% | 0.20% | — | — | 0.20% |
| Sodium caseinate | — | — | 0.20% | 0.20% | — | — | 0.20% |
| Corn starch | 5.00% | 5.00% | 7.00% | 7.00% | 5.00% | 5.00% | 5.00% |
| Wheat starch | 2.00% | 2.00% | — | — | 2.00% | 2.00% | 2.00% |

TABLE 1-continued

Inventive Formulations of Mid-High End Sausage

|  | Inventive Ex. M1 (IE M1) | Inventive Ex. M2 (IE M2) | Inventive Ex. M3 (IE M3) | Inventive Ex. M4 (IE M4) | Inventive Ex. M5 (IE M5) | Inventive Ex. M6 (IE M6) | Inventive Ex. M7 (IE M7) |
|---|---|---|---|---|---|---|---|
| Potato starch | 2.00% | 2.00% | — | — | 2.00% | 2.00% | 2.00% |
| Acetylated distarch phosphate (modified starch) | — | — | 1.30% | 1.30% | — | — | 1.30% |
| Sugar | 2.00% | 2.00% | 2.00% | 2.00% | 2.00% | 2.00% | 2.00% |
| The five-spice powder | 0.10% | 0.10% | 0.10% | 0.10% | 0.10% | 0.10% | 0.10% |
| Ice water | 44.53% | 44.53% | 44.83% | 44.83% | 44.53% | 44.53% | 41.53% |
| Total | 100.00% | 100.00% | 100.00% | 100.00% | 100.00% | 100.00% | 100.00% |
| Weight ratio of konjac (incl. water):carrageenan (incl. water):cellulose ether | 5:5:3 | 5:5:3 | 5:5:3 | 5:5:3 | 5:5:5 | 5:5:7 | 5:5:60 |
| Sum of konjac (incl. water) + carrageenan (incl. water) + cellulose ether | 1.30% | 1.30% | 1.30% | 1.30% | 1.30% | 1.30% | 1.30% |
| W. ratio of glucomannan:carrageenan | 1:0.85-1:0.96 | 1:0.85-1:0.96 | 1:0.85-1:0.96 | 1:0.85-1:0.96 | 1:0.85-1:0.96 | 1:0.85-1:0.96 | 1:0.85-1:0.96 |
| W. ratio of glucomannan:cellulose ether | 1:0.60-1:0.65 | 1:0.60-1:0.65 | 1:0.60-1:0.65 | 1:0.60-1:0.65 | 1:1.00-1:1.07 | 1:1.40-1:1.52 | 1:12-1:14 |

TABLE 2

Comparative Formulations of Mid-High End Sausage

|  | Comparative Example M8 (CE M8) | Comparative Example M9 (CE M9) | Comparative Example M10 (CE M10) | Comparative Example M11 (CE M11) | Comparative Example M12 (CE M12) | Comparative Example M13 (CE M13) |
|---|---|---|---|---|---|---|
| Pork lean | 30.00% | 36.38% | 30.00% | — | — | — |
| Leaf fat | 10.00% | 10.13% | 10.00% | — | — | — |
| Chicken breast | — | — | — | 30.00% | 30.00% | 30.00% |
| Duck skin | — | — | — | 10.00% | 10.00% | 10.00% |
| NaCl | 2.00% | 2.03% | 2.00% | 2.00% | 2.00% | 2.00% |
| Sodium tripolyphosphate | 0.15% | 0.15% | 0.15% | 0.15% | 0.15% | 0.15% |
| Sodium pyrophosphate | 0.20% | 0.20% | 0.20% | 0.20% | 0.20% | 0.20% |
| Sodium hexametaphosphate | 0.15% | 0.15% | 0.15% | 0.15% | 0.15% | 0.15% |
| Monosodium glutamate | 0.50% | 0.51% | 0.50% | 0.50% | 0.50% | 0.50% |
| KCl | 0.07% | 0.07% | 0.20% | 0.07% | — | 0.07% |
| Konjac | 0.65% | — | — | — | 0.80% | — |
| Carrageenan | 0.65% | — | — | — | — | 0.80% |
| Methocel™ F50 | — | — | — | — | 0.50% | 0.50% |
| Commercial sausage gum | — | — | 1.30% | — | — | — |
| Soy protein isolate | — | — | — | 1.30% | — | — |
| TG | — | — | — | 0.20% | 0.20% | 0.20% |
| Sodium caseinate | — | — | — | 0.20% | 0.20% | 0.20% |
| Corn starch | 5.00% | 5.07% | 5.00% | 7.00% | 7.00% | 7.00% |
| Wheat starch | 2.00% | 2.03% | 2.00% | — | — | — |
| potato starch | 2.00% | 2.03% | 2.00% | — | — | — |
| Acetylated distarch phosphate (modified starch) | — | — | — | 1.30% | 1.30% | 1.30% |
| Sugar | 2.00% | 2.03% | 2.00% | 2.00% | 2.00% | 2.00% |
| The five-spice powder | 0.10% | 0.10% | 0.10% | 0.10% | 0.10% | 0.10% |
| Ice water | 44.53% | 39.12% | 44.40% | 44.83% | 44.90% | 44.83% |
| Total | 100.00% | 100% | 100.00% | 100.00% | 100.00% | 100.00% |
| Weight ratio of konjac:carrageenan:cellulose ether | 5:5:0 | 0:0:0 | 0:0:0 | 0:0:0 | 8:0:5 | 0:8:5 |

Low End Sausage

Table 3 shows inventive formulations of low end sausage and Table 4 shows comparative formulations of low end sausage.

IE L1 uses the present inventive edible blend comprising konjac, carrageenan and Methocel™ F50 in a weight ratio of 5:5:3. IE L2 and IE L3 contain transglutaminase enzyme which is a commonly used additive in sausage industry; IE L3 further contains soy protein isolate. IE L4 and IE L5 contain not only transglutaminase enzyme, but also sodium caseinate as an auxiliary protein in sausage. Furthermore, IE L4 and IE L5 use a modified starch. IE L8 replaces konjac with locust bean gum. IE L6 and IE L7 are similar to IE L1 but the weight ratio of konjac:carrageenan:cellulose ether is equal to 5:5:5 in IE L6 and equal to 5:5:7 in IE L7. IE L9, IE L10 and IE L11 are similar to IE L8, but replace locust bean gum with guar, fenugreek and tara gum, respectively. CE L12 excludes any hydrocolloid. CE L13 comprises commercial sausage gum but lacks the present inventive edible blend.

TABLE 3a

Inventive Formulations of Low End Sausage

| | Inv. Ex. L1 (IE L1) | Inv. Ex. L2 (IE L2) | Inv. Ex. L3 (IE L3) | Inv. Ex. L4 (IE L4) | Inv. Ex. L5 (IE L5) | Inv. Ex. L6 (IE L6) | Inv. Ex. L7 (IE L7) |
|---|---|---|---|---|---|---|---|
| Chicken breast | 12.00% | 12.00% | 12.07% | 11.65% | 11.65% | 12.00% | 12.00% |
| Duck skin | 30.00% | 15.00% | 15.00% | 14.97% | 14.97% | 30.00% | 30.00% |
| NaCl | 2.00% | 1.82% | 1.83% | 1.77% | 1.77% | 2.00% | 2.00% |
| Sodium tripolyphosphate | 0.16% | 0.14% | 0.14% | 0.14% | 0.14% | 0.16% | 0.16% |
| Sodium pyrophosphate | 0.16% | 0.14% | 0.14% | 0.14% | 0.14% | 0.16% | 0.16% |
| Sodium hexametaphosphate | 0.08% | 0.08% | 0.08% | 0.08% | 0.08% | 0.08% | 0.08% |
| Monosodium glutamate | 0.50% | 0.42% | 0.50% | 0.50% | 0.50% | 0.50% | 0.50% |
| KCl | 0.07% | 0.06% | 0.07% | 0.07% | 0.07% | 0.07% | 0.07% |
| Konjac | 0.10% | 0.38% | 0.08% | 0.19% | 0.19% | 0.087% | 0.076% |
| Carrageenan | 0.10% | 0.38% | 0.08% | 0.19% | 0.19% | 0.087% | 0.076% |
| Methocel ™ F50 | 0.06% | 0.23% | 0.05% | 0.12% | 0.12% | 0.087% | 0.107% |
| TG | — | 0.17% | 0.20% | 0.20% | 0.20% | — | — |
| Sodium caseinate | — | — | — | 0.20% | 0.20% | — | — |
| Soy protein isolate | 1.03% | — | 0.79% | — | — | 1.03% | 1.03% |
| Corn starch | 10.00% | 10% | 13% | 13.97% | 13.97% | 10% | 10% |
| Acetate starch | — | — | — | — | 1.21% | — | — |
| Acetylated distarch phosphate (modified starch) | — | — | — | 1.21% | — | — | — |
| Sugar | 2.00% | 1.68% | 2% | 2% | 2% | 2% | 2% |
| The five-spice powder | 0.10% | 0.08% | 0.10% | 0.10% | 0.10% | 0.1% | 0.1% |
| Ice water | 41.63% | 57.42% | 53.87% | 52.50% | 52.50% | 41.64% | 41.64% |
| Total | 100.00% | 100.00% | 100.00% | 100.00% | 100.00% | 100.00% | 100.00% |
| Weight ratio of konjac (incl. water):carrageenan (incl. water):cellulose ether | 5:5:3 | 5:5:3 | 5:5:3.13 | 5:5:3.16 | 5:5:3.16 | 5:5:5 | 5:5:7 |
| Sum of konjac (incl. water) + carrageenan (incl. water) + cellulose ether | 0.26% | 0.99% | 0.21% | 0.50% | 0.50% | 0.26% | 0.26% |
| W. ratio of glucomannan:carrageenan | 1:0.85-1:0.96 | 1:0.85-1:0.96 | 1:0.85-1:0.96 | 1:0.85-1:0.96 | 1:0.85-1:0.96 | 1:0.85-1:0.96 | 1:0.85-1:0.96 |
| W. ratio of glucomannan:cellulose ether | 1:0.60-1:0.65 | 1:0.60-1:0.65 | 1:0.63-1:0.68 | 1:0.63-1:0.69 | 1:0.63-1:0.69 | 1:1.00-1:1.07 | 1:1.40-1:1.52 |

TABLE 3b

Inventive Formulations of Low End Sausage

| | Inventive Ex. L8 (IE L8) | Inventive Ex. L9 (IE L9) | Inventive Ex. L10 (IE L10) | Inventive Ex. L11 (IE L11) |
|---|---|---|---|---|
| Chicken breast | 11.65% | 11.65% | 11.65% | 11.65% |
| Duck skin | 14.97% | 14.97% | 14.97% | 14.97% |
| NaCl | 1.77% | 1.77% | 1.77% | 1.77% |
| Sodium tripolyphosphate | 0.14% | 0.14% | 0.14% | 0.14% |
| Sodium pyrophosphate | 0.14% | 0.14% | 0.14% | 0.14% |
| Sodium hexametaphosphate | 0.08% | 0.08% | 0.08% | 0.08% |
| Monosodium glutamate | 0.50% | 0.50% | 0.50% | 0.50% |
| KCl | 0.07% | 0.07% | 0.07% | 0.07% |
| Carrageenan | 0.19% | 0.19% | 0.19% | 0.19% |
| Methocel ™ F50 | 0.12% | 0.12% | 0.12% | 0.12% |
| Guar gum | — | 0.19% | — | — |
| Fenugreek gum | — | — | 0.19% | — |
| Tara gum | — | — | — | 0.19% |
| Locust bean gum | 0.19% | — | — | — |
| Commercial sausage gum | — | — | — | — |
| TG | 0.20% | 0.20% | 0.20% | 0.20% |
| Sodium caseinate | 0.20% | 0.20% | 0.20% | 0.20% |
| Soy protein isolate | — | — | — | — |
| Corn starch | 13.97% | 13.97% | 13.97% | 13.97% |
| Acetylated distarch phosphate | 1.21% | 1.21% | 1.21% | 1.21% |
| Sugar | 2% | 2% | 2% | 2% |
| The five-spice powder | 0.10% | 0.10% | 0.10% | 0.10% |
| Ice water | 52.51% | 52.51% | 52.51% | 52.51% |
| Total | 100.00% | 100.00% | 100.00% | 100.00% |
| Weight ratio of locust bean or guar or fenugreek or tara gum (incl. water):carrageenan (incl. water):cellulose ether | 5:5:3.16 | 5:5:3.16 | 5:5:3.16 | 5:5:3.16 |

TABLE 3b-continued

Inventive Formulations of Low End Sausage

| | Inventive Ex. L8 (IE L8) | Inventive Ex. L9 (IE L9) | Inventive Ex. L10 (IE L10) | Inventive Ex. L11 (IE L11) |
|---|---|---|---|---|
| Sum of locust bean or guar or fenugreek or tara gum (incl. water) + carrageenan (incl. water) + cellulose ether | 0.50% | 0.50% | 0.50% | 0.50% |
| W. ratio of galactomannan:carrageenan | 1:0.85-1:0.96 | 1:0.85-1:0.98 | 1:0.85-1:0.98 | 1:0.85-1:0.98 |
| W. ratio of galactomannan:cellulose ether | 1:0.63-1:0.69 | 1:0.63-1:0.70 | 1:0.63-1:0.70 | 1:0.63-1:0.70 |

TABLE 4

Comparative Formulations of Low End Sausage

| | Comparative Example L12 (CE L12) | Comparative Example L13 (CE L13) |
|---|---|---|
| Chicken breast | 12.00% | 12.00% |
| Duck skin | 30.00% | 30.00% |
| NaCl | 2.00% | 2.00% |
| Sodium tripolyphosphate | 0.16% | 0.16% |
| Sodium pyrophosphate | 0.16% | 0.16% |
| Sodium hexametaphosphate | 0.08% | 0.08% |
| Monosodium glutamate | 0.50% | 0.50% |
| KCl | 0.07% | 0.20% |
| Konjac | — | — |
| Carrageenan | — | — |
| Methocel ™ F50 | — | — |
| Commercial sausage gum | — | 0.27% |
| TG | — | — |
| Sodium caseinate | — | — |
| Soy protein isolate | 1.30% | 1.03% |
| Corn starch | 10.00% | 10.00% |
| Acetate starch | — | — |
| Acetylated distarch phosphate (modified starch) | — | — |
| Sugar | 2.00% | 2.00% |
| The five-spice powder | 0.10% | 0.10% |
| Ice water | 41.63% | 41.50% |
| Total | 100.00% | 100.00% |
| Weight ratio of konjac:carageenan:cellulose ether | 0:0:0 | 0:0:0 |

Sample Preparation

All meat (pork lean or chicken breast) and fat (leaf fat and duck skin) were stored at 4° C. overnight before use and were then minced in a meat grinder separately. All meat (pork lean or chicken breast), fat (leaf fat and duck skin) and ¼ of the ice water were added to a cutting and mixing machine for cut and mix for about 30 seconds. NaCl, phosphate salt and ¼ of ice water were added into the cutting and mixing machine for cut and mix for about 30 seconds. All gums (konjac, carrageenan, locust bean gum, cellulose ether, soy protein isolate, commercial sausage gum) and ¼ of the ice water were added to the cutting and mixing machine for cut and mix for about 60 seconds. All seasonings (sugar, the five-spice-powder and monosodium glutamate) were added to the cutting and mixing machine for cut and mix for about 30 seconds. All starch (corn starch, potato starch, wheat starch, and modified starch) and the last ¼ of ice water were added to the cutting and mixing machine for cut and mix for about 60 seconds. Cutting and mixing were continued for about 3.5 min until a homogenized meat emulsion formed. The meat emulsion was transferred to a specific container for deaeration on a vacuum mixer. The vacuum mix lasted for about 30 seconds. The deaerated meat emulsions were stuffed into plastic casings or collagen casings. The sausages were heated in a water bath at 82° C. for about 1 h. Afterwards the sausages were taken out of the water bath and the casings were cut off by a scissor for testing the sausage performance.

Test Methods

Texture Profile Analysis (TPA)

The texture profile analysis was conducted with a TA.XT.Plus-Texture Analyzer produced by Stable Micro Systems, United Kingdom. The peeled sausages were cut into links which were each 3 cm in length. The test mode was two compression mode ("two bite test"). The test settings were as follows:

Pre-test speed: 1.0 mm/sec
Test speed: 5.0 mm/sec
Post-test speed: 5.0 mm/sec
Target mode: Strain
Strain: 40%
Trigger force: 5.0 g
Time: 5 seconds
Probe: P/36R Texture profile analysis is a common method to characterize food. In the present case hardness, springiness, adhesiveness, cohesiveness, and chewiness were measured.

"Hardness" in g corresponds to the maximum force during the first cycle of compression ("first bite").

"Springiness" describes how well a product recovers between first and second bites. In the force-time diagram it equals the ratio of the distance of the detected height of the product on the second compression and the original compression distance. Accordingly, high values correspond to high springiness which is favorable.

"Adhesiveness" in g·s corresponds to the maximum negative work of the first compression cycle. Lower absolute values correspond to lower adhesiveness.

"Cohesiveness" describes how well a product withstands a second deformation relative to how it behaved under the first deformation. It corresponds to the ratio of the positive work during the second cycle of compression to that of the first cycle Accordingly, high values correspond to high cohesiveness which is favorable.

Chewiness is calculated as hardness*springiness*cohesiveness. High values are favorable.

Sensory and Visual Test Method

The evaluation of sensory and visual characteristics of the sausages was conducted by a panel of eight assessors within the age range of 26-40 years. Eight samples were presented to the assessors and they were required to rinse with water before tasting each sample. Sample presentation order was randomized to prevent any flavor carryover effects. Assessors were required to evaluate the sausages using the following descriptors: hardness, springiness, adhesiveness, chewiness and appearance of cross section. A five-point hedonic scale with the following rating was used:

5=liked extremely,
4=liked moderately
3=neither liked nor disliked
2=disliked moderately
1=disliked extremely.

Test Results and Discussion

Mid-High End Sausage

When the sausage casings of CE M8 and CE M9 were cut off by a scissor at high temperature (about 82° C.), the sausages cracked and the texture was coarse (sponge-like). The remaining samples did not crack. Moreover, the texture of IE M1, IE M2, IE M3, IE M4, IE M5, IE M6 and IE M7 was smoother and tighter than that of CE M10 and CE M11.

Tables 5 and 6 show texture comparison including hardness, springiness, adhesiveness, cohesiveness and chewiness and sensory test results of the sausage samples, respectively.

As can be seen from Tables 5 and 6, the chewiness and hardness of the inventive examples are higher than that of CE M8 to M11. Although the chewiness and hardness of CE M12 and M13 are higher than that of some inventive examples, e.g. IE M1, their absolute value of adhesiveness are much higher than that of the inventive examples and thus unacceptable for the consumer. Furthermore, the absolute values of adhesiveness of IE M1 to IE M5 and IE M7 are lower than that of all comparative examples, which means that those inventive examples are not as sticky to teeth as the comparative examples. Only IE M6 has a higher adhesiveness value than some of the comparative examples which value is still acceptable. High chewiness, hardness and low stickiness to teeth are favorable for the consumers. Moreover, the visual ratings for the appearance of the cross section of CE M8 to CE M11 are inferior to all inventive examples. Actually, the springiness and cohesiveness values of all comparative examples and inventive examples are high enough.

Low-End Sausage

Inspecting the meat emulsions before stuffing them into the casings it could be seen that the surfaces of meat emulsion of the inventive examples were smoother and lighter colored than that of comparative examples. Also, free oil droplets were clearly visible in CE L12 and CE L13, which is not desirable. That means the meat emulsions of the comparative examples are much more unstable, which may potentially lead to worse sausage performance and decreased consumer appeal.

Table 7 and 8 show texture comparison including hardness, springiness, adhesiveness, cohesiveness and chewiness and sensory test results of the sausage samples, respectively.

As can be seen from Tables 7 and 8, the chewiness and hardness of the inventive examples are higher than that of the comparative examples. The absolute values of adhesiveness of IE L1 to IE L6, and IE L8 to IE L11 are lower than that of comparative examples, which means that those inventive examples are not as sticky to teeth as the comparative examples. Only IE L7 has a slightly higher adhesiveness. Moreover, the visual ratings for the appearance of the cross section of the comparative examples are inferior to all inventive examples. The cohesiveness of all inventive examples is a little bit higher than that of the comparative examples.

SUMMARY

It is evident from the preceding results that the use of the present inventive edible composition as a sausage additive significantly improves sausage texture quality and organoleptic (sensory) quality/appearance of the sausage. The present invention imparts well-balanced texture and sensory qualities to sausage. Moreover, it has been found that this is accomplished without increasing production cost.

TABLE 5

Results of Texture Profile Analysis (TPA) of Mid-High End Sausage

| Parameter | IE M1 | IE M2 | IE M3 | IE M4 | IE M5 | IE M6 | IE M7 | CE M8 | CE M9 | CE M10 | CE M11 | CE M12 | CE M13 |
|---|---|---|---|---|---|---|---|---|---|---|---|---|---|
| Hardness (g) | 3675 | 6209 | 4870 | 5991 | 3860 | 3370 | 5601 | 1148 | 1764 | 2021 | 2308 | 3740 | 5129 |
| Springiness | 0.92 | 0.93 | 0.93 | 0.93 | 0.84 | 0.88 | 0.92 | 0.92 | 0.96 | 0.94 | 0.94 | 0.93 | 0.95 |
| Adhesiveness (g·s) | −8 | −8 | −9 | −5 | −9 | −28 | −4 | −66 | −10 | −10 | −17 | −152 | −42 |
| Cohesiveness | 0.77 | 0.78 | 0.77 | 0.77 | 0.66 | 0.75 | 0.75 | 0.84 | 0.82 | 0.81 | 0.8 | 0.77 | 0.79 |
| Chewiness (g) | 2603 | 4504 | 3487 | 4290 | 2140 | 2224 | 3865 | 887 | 1389 | 1539 | 1736 | 2678 | 3849 |

TABLE 6

Results of Sensory and Visual Evaluation of Mid-High End Sausage

| Parameter | IE M1 | IE M2 | IE M3 | IE M4 | IE M5 | IE M6 | IE M7 | CE M8 | CE M9 | CE M10 | CE M11 | CE M12 | CE M13 |
|---|---|---|---|---|---|---|---|---|---|---|---|---|---|
| Hardness | 3.4 | 4.8 | 4 | 4.2 | 3.5 | 2 | 4.1 | 1.2 | 1.6 | 1.5 | 2 | 3 | 3 |
| Springiness | 4 | 4.8 | 4.1 | 4.2 | 4.1 | 4.1 | 4.5 | 4.2 | 4.5 | 4.3 | 4.4 | 4 | 4 |
| Adhesiveness | 3.8 | 4 | 4 | 4 | 3.7 | 2 | 4 | 2.1 | 2.2 | 2.2 | 2.3 | 1 | 2 |
| Chewiness | 3.5 | 5 | 4 | 4.3 | 3.4 | 2 | 4.3 | 1 | 1.7 | 1.5 | 2 | 4 | 4 |
| Appearance of cross section | 4.8 | 5 | 4.9 | 4.8 | 4.5 | 3.3 | 4 | 1.3 | 1.2 | 1.5 | 1.3 | 4 | 4 |

TABLE 7

Results of Texture Profile Analysis (TPA) of Low End Sausage

| Parameter | IE L1 | IE L2 | IE L3 | IE L4 | IE L5 | IE L6 | IE L7 | IE L8 | IE L9 | IE L10 | IE L11 | CE L12 | CE L13 |
|---|---|---|---|---|---|---|---|---|---|---|---|---|---|
| Hardness (g) | 1761 | 1965 | 2802 | 3194 | 2812 | 1830 | 1608 | 4305 | 3600 | 3751 | 2912 | 1203 | 1154 |
| Springiness | 0.95 | 0.91 | 0.9 | 0.97 | 0.88 | 0.94 | 0.91 | 0.89 | 0.92 | 0.89 | 0.9 | 0.94 | 0.94 |
| Adhesiveness (g · s) | −2.2 | −1.4 | −2.1 | −1.8 | −1 | −2.5 | −5.4 | −1.9 | −1.2 | −2 | −2.5 | −3.3 | −4.8 |
| Cohesiveness | 0.82 | 0.83 | 0.83 | 0.84 | 0.83 | 0.81 | 0.78 | 0.82 | 0.8 | 0.81 | 0.82 | 0.73 | 0.73 |
| Chewiness (g) | 1372 | 1484 | 2093 | 2602 | 2054 | 1393 | 1141 | 3142 | 2650 | 2704 | 2149 | 825 | 792 |

TABLE 8

Results of Sensory and Visual Evaluation of Low End Sausage

| Parameter | IE L1 | IE L2 | IE L3 | IE L4 | IE L5 | IE L6 | IE L7 | IE L8 | IE L9 | IE L10 | IE L11 | CE L12 | CE L13 |
|---|---|---|---|---|---|---|---|---|---|---|---|---|---|
| Hardness | 2.5 | 2.5 | 3.2 | 4.8 | 4 | 3 | 2.5 | 4.1 | 3.5 | 3.6 | 3.5 | 1.1 | 1.4 |
| Springiness | 4.3 | 4.5 | 4.2 | 4.8 | 4.1 | 4.1 | 4.2 | 4 | 4.1 | 3.9 | 4 | 4.1 | 4.4 |
| Adhesiveness | 3.3 | 3 | 4.2 | 4 | 4.6 | 3 | 1.1 | 2.5 | 3.8 | 3.8 | 3.9 | 1.3 | 1.5 |
| Chewiness | 2.8 | 2 | 3.5 | 5 | 4 | 2.2 | 2 | 3.9 | 3.7 | 3.5 | 3.3 | 1 | 1.7 |
| Appearance of cross section | 3.4 | 4 | 4.8 | 5 | 4.9 | 4 | 3.5 | 4 | 4 | 4 | 4 | 1.3 | 1.2 |

What is claimed is:

1. An edible composition consisting of
   (a) natural gum comprising a polysaccharide hydrocolloid (a1) containing mannose repeating units;
   (b) carrageenan;
   (c) cellulose ether, and optionally
   (d) water,
   wherein the weight ratio of carrageenan (b) to polysaccharide hydrocolloid (a1) ranges from 0.4:1 to 1.4:1 and the weight ratio of cellulose ether (c) to polysaccharide hydrocolloid (a1) is at least 0.02:1, and wherein the cellulose ether (c) is hydroxypropyl methylcellulose, methylcellulose, or a mixture thereof.

2. The edible composition of claim 1, wherein the weight ratio of cellulose ether (c) to polysaccharide hydrocolloid (a1) ranges from 0.6:1 to 1.1:1.

3. The edible composition of claim 2, wherein the weight ratio of carrageenan (b) to polysaccharide hydrocolloid (a1) ranges from 0.6:1 to 1.2:1, and the weight ratio of cellulose ether (c) to polysaccharide hydrocolloid (a1) ranges from 0.5:1 to 1.3:1.

4. The edible composition of claim 1, wherein the polysaccharide hydrocolloid (a1) is a glucomannan, galactomannan, or a mixture thereof.

5. The edible composition of claim 4, wherein the natural gum (a) is konjac gum, fenugreek gum, guar gum, tara gum, locust bean gum, or mixtures thereof.

6. The edible composition of claim 1, wherein the carrageenan (b) is κ-carrageenan, τ-carrageenan, λ-carrageenan, or a mixture thereof.

7. An edible binder blend consisting of 1 to 99% by weight of the edible composition of claim 1 and 1 to 99% by weight of protein.

8. An edible product comprising 0.05 to less than 100% by weight of the edible composition of claim 1, wherein the weight ratio of carrageenan (b) to polysaccharide hydrocolloid (a1) in the edible product ranges from 0.4:1 to 1.4:1 and the weight ratio of cellulose ether (c) to polysaccharide hydrocolloid (a1) in the edible product is from 0.5:1 to 1.3:1 and the edible product further comprises comminuted meat.

9. The edible product of claim 8 comprising from 0.1 to 4% by weight of the edible composition of claim 1 and from 8 to 70% by weight of comminuted meat.

10. The edible product of claim 8 which is sausage.

11. The edible composition of claim 1, wherein the natural gum (a) is konjac gum.

12. The edible composition of claim 1, wherein the weight ratio of cellulose ether (c) to polysaccharide hydrocolloid (a1) ranges from 0.1:1 to 15:1.

13. The edible composition of claim 1, wherein the weight ratio of cellulose ether (c) to polysaccharide hydrocolloid (a1) ranges from 0.5:1 to 1.3:1.

14. The edible composition of claim 1, wherein the weight ratio of carrageenan (b) to polysaccharide hydrocolloid (a1) ranges from 0.7:1 to 1.1:1.

15. The edible composition of claim 1, wherein the carrageenan (b) is x-carrageenan.

16. The edible composition of claim 1, wherein the natural gum (a) is konjac gum, locust bean gum or a mixture thereof.

17. The edible composition of claim 1, wherein the hydroxypropyl methylcellulose has an average degree of substitution $DS_{methyl}$ of from 1.4 to 2.5, a molar degree of substitution $MS_{hydroxypropyl}$ of from 0.1 to 0.4, and a viscosity of from 20 to 100 mPa·s measured as a 2% by weight aqueous solution by a Brookfield LVT viscometer (3# spindle, testing speed 50 rpm) at 25° C.

18. The edible composition of claim 1, wherein the methylcellulose has an average degree of substitution $DS_{methyl}$ of from 1.4 to 2.2, and a viscosity of from 13,000 to 70,000 mP·s measured as a 2% by weight aqueous solution by a Brookfield LVT viscometer (3# spindle, testing speed 50 rpm) at 25° C.

* * * * *